United States Patent
Otaki et al.

(10) Patent No.: US 10,818,977 B2
(45) Date of Patent: *Oct. 27, 2020

(54) METHOD FOR PRODUCING ALL SOLID STATE BATTERY, ALL SOLID STATE BATTERY AND ALL SOLID STATE BATTERY SYSTEM

(71) Applicant: TOYOTA JIDOSHA KABUSHIKI KAISHA, Toyota-shi, Aichi-ken (JP)

(72) Inventors: Mitsutoshi Otaki, Susono (JP); Norihiro Ose, Sunto-gun (JP); Shigenori Hama, Sunto-gun (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/377,991

(22) Filed: Apr. 8, 2019

(65) Prior Publication Data

US 2019/0319309 A1    Oct. 17, 2019

(30) Foreign Application Priority Data

Apr. 16, 2018  (JP) .................................. 2018-078371

(51) Int. Cl.
*H01M 10/0585* (2010.01)
*H01M 10/0562* (2010.01)
(Continued)

(52) U.S. Cl.
CPC ....... *H01M 10/0585* (2013.01); *H01M 4/386* (2013.01); *H01M 10/0562* (2013.01);
(Continued)

(58) Field of Classification Search
CPC .......... H01M 10/0468; H01M 10/052; H01M 10/0525; H01M 10/0562; H01M 10/0585;
(Continued)

(56) References Cited

U.S. PATENT DOCUMENTS

2012/0070738 A1* 3/2012 Yoshida ................ H01M 4/366
429/218.1
2013/0252089 A1   9/2013 Kuriki
(Continued)

FOREIGN PATENT DOCUMENTS

JP  2003-109590 A  4/2003
JP  2013-069416 A  4/2013
(Continued)

OTHER PUBLICATIONS

Zhang et al., "High-Columbic-Efficiency Lithium Battery Based on Silicon Particle Materials", Nanoscale Research Letters, 2015, 10:395, pp. 1-5 (total 5 pages).
(Continued)

*Primary Examiner* — Carlos Barcena
(74) *Attorney, Agent, or Firm* — Sughrue Mion, PLLC (57) ABSTRACT

A main object of the present disclosure is to provide a method for producing an all solid state battery capable of satisfying both of improving capacity durability and suppressing the increase of an initial resistance. The above object is achieved by providing a method for producing an all solid state battery, the method comprising: a preparing step of preparing an all solid state battery including a cathode layer, a solid electrolyte layer, and an anode layer, in this order; and an initial charging step of initially charging the all solid state battery, wherein the anode layer includes a metal particle capable of being alloyed with Li, and having two kinds or more of crystal orientation in one particle, as an anode active material, and in the initial charging step, the all solid state battery is charged to a battery voltage of 4.35 V or more and 4.55 V or less.

7 Claims, 2 Drawing Sheets

(51) Int. Cl.
*H01M 10/46* (2006.01)
*H01M 10/44* (2006.01)
*H01M 4/38* (2006.01)
*H02J 7/00* (2006.01)
*H01M 4/02* (2006.01)

(52) U.S. Cl.
CPC ......... *H01M 10/446* (2013.01); *H01M 10/46* (2013.01); *H02J 7/0068* (2013.01); *H01M 2004/027* (2013.01); *H01M 2300/0068* (2013.01)

(58) Field of Classification Search
CPC ........... H01M 10/446; H01M 10/2004; H01M 10/021; H01M 2004/027; H01M 2300/0068; H01M 4/134; H01M 4/386; H01M 4/62
See application file for complete search history.

(56) References Cited

U.S. PATENT DOCUMENTS

| | | |
|---|---|---|
| 2014/0287317 A1 | 9/2014 | Tiquet et al. |
| 2015/0180076 A1 | 6/2015 | Hasegawa et al. |
| 2015/0236373 A1 | 8/2015 | Ohtomo et al. |
| 2017/0077732 A1 | 3/2017 | Otaki et al. |
| 2017/0092942 A1 | 3/2017 | Fukasawa et al. |
| 2018/0212227 A1 | 7/2018 | Otaki et al. |

FOREIGN PATENT DOCUMENTS

| | | |
|---|---|---|
| JP | 2013-105701 A | 5/2013 |
| JP | 2013-211238 A | 10/2013 |
| JP | 2014-035987 A | 2/2014 |
| JP | 2014-041783 A | 3/2014 |
| JP | 2015-501279 A | 1/2015 |
| JP | 2015-118867 A | 6/2015 |
| JP | 2015-156297 A | 8/2015 |
| JP | 2016-184495 A | 10/2016 |
| JP | 2017-059534 A | 3/2017 |
| JP | 2018-120735 A | 8/2018 |
| WO | 2015/140907 A1 | 9/2015 |

OTHER PUBLICATIONS

Non-Final Office Action dated Jul. 30, 2019 from USPTO in U.S. Appl. No. 15/853,125.

Notice of Allowance dated Nov. 12, 2019 from USPTO in U.S. Appl. No. 15/853,125.

\* cited by examiner

METHOD FOR PRODUCING ALL SOLID STATE BATTERY, ALL SOLID STATE BATTERY AND ALL SOLID STATE BATTERY SYSTEM

TECHNICAL FIELD

The present disclosure relates to a method for producing an all solid state battery capable of satisfying both of improving capacity durability and suppressing the increase of an initial resistance.

BACKGROUND ART

An all solid state battery is a battery including a solid electrolyte layer between a cathode layer and an anode layer, and having an advantage that, compared to a liquid battery having a liquid electrolyte including a flammable organic solvent, it is easier to simplify the safeguard thereof. Also, alloy-based anode active materials (metal particles) such as Si are known as anode active materials.

For example, Patent Literature 1 discloses an all solid state battery system including an all solid state battery containing an alloy-based anode active material, and a controlling apparatus. Also, Patent Literature 1 discloses a method for producing an all solid state battery system including an initial charging step of charging the all solid state battery to a voltage higher than charging and discharging voltage in use of the all solid state battery.

CITATION LIST

Patent Literature

Patent Literature 1: Japanese Patent Application Laid-Open (JP-A) No. 2017-059534

SUMMARY OF DISCLOSURE

Technical Problem

In Patent Literature 1, the capacity durability is improved by charging the all solid state battery to a voltage higher than the voltage at normal use, in the initial charging step so as to facilitate the amorphization of the alloy-based anode active material. However, when the battery voltage during charge (charging voltage) is high, the cathode active material is easily deteriorated, and as the result, a new problem occurs that the initial resistance of the all solid state battery is increased.

The present disclosure has been made in view of the above circumstances, and a main object thereof is to provide a method for producing an all solid state battery capable of satisfying both of improving capacity durability and suppressing the increase of an initial resistance.

Solution to Problem

The present disclosure provides a method for producing an all solid state battery, the method comprising: a preparing step of preparing an all solid state battery including a cathode layer, a solid electrolyte layer, and an anode layer, in this order; and an initial charging step of initially charging the all solid state battery, wherein the anode layer includes a metal particle capable of being alloyed with Li, and having two kinds or more of crystal orientation in one particle, as an anode active material, and in the initial charging step, the all solid state battery is charged to a battery voltage of 4.35 V or more and 4.55 V or less.

According to the present disclosure, by using a predetermined metal particle as the anode active material and by charging the all solid state battery so that the battery voltage is in an appropriately high range, an all solid state battery capable of satisfying both of improving capacity durability and suppressing the increase of an initial resistance may be obtained.

In the disclosure, the metal particle may be a simple substance of Si or a Si alloy.

In the disclosure, the anode layer may include a sulfide solid electrolyte.

Also, the present disclosure provides an all solid state battery comprising a cathode layer, a solid electrolyte layer, and an anode layer, in this order, and the anode layer includes a metal particle capable of being alloyed with Li, and having two kinds or more of crystal orientation in one particle, as an anode active material, and an amorphization rate of the metal particle is 40.2% or more and 49.6% or less.

According to the present disclosure, a predetermined metal particle is used as the anode active material so that the amorphization rate thereof is in a predetermined range. Therefore, the all solid state battery is capable of satisfying both of improving capacity durability and suppressing the increase of an initial resistance.

In the disclosure, the metal particle may be a simple substance of Si or a Si alloy.

In the disclosure, the anode layer may include a sulfide solid electrolyte.

Also, the present disclosure provides an all solid state battery system comprising the above described all solid state battery and a controlling apparatus controlling charge and discharge of the all solid state battery, and the controlling apparatus is an apparatus that controls an upper limit of a battery voltage to 4.35 V or less.

According to the present disclosure, by using the above described all solid state battery and by controlling the upper limit of the battery voltage thereof, the all solid state battery system is capable of satisfying both of improving capacity durability and suppressing the increase of an initial resistance, and further, suppressing the increase of a resistance over time.

Advantageous Effects of Disclosure

The present disclosure exhibits effects such that an all solid state battery capable of satisfying both of improving capacity durability and suppressing the increase of an initial resistance may be obtained.

DESCRIPTION OF EMBODIMENTS

The method for producing an all solid state battery, the all solid state battery and the all solid state battery system of the present disclosure are hereinafter described in details.

A. Method for Producing all Solid State Battery

Figure 1:
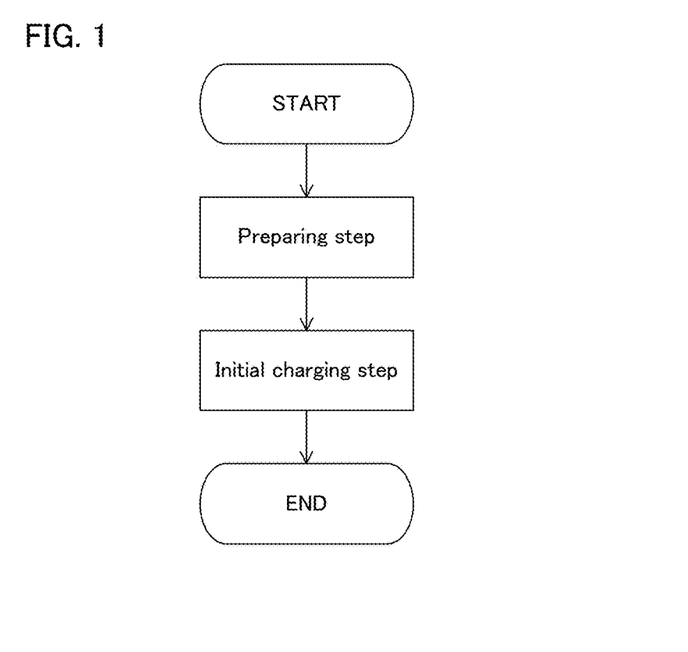
FIG. 1 is a flow diagram illustrating an example of the method for producing an all solid state battery of the present disclosure.
Figure 2:
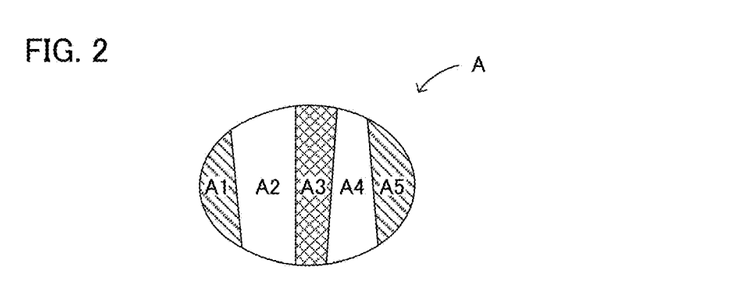
FIG. 2 is a schematic cross-sectional view illustrating an example of the metal particle in the present disclosure.

FIG. 1 is a flow diagram illustrating an example of the method for producing an all solid state battery of the present disclosure. First, an all solid state battery including a cathode layer, a solid electrolyte layer, and an anode layer, in this order is prepared (preparing step). The anode layer includes a metal particle capable of being alloyed with Li, and having two kinds or more of crystal orientation in one particle, as an anode active material. For example, metal particle A shown in FIG. 2 is capable of being alloyed with Li, and has two kinds or more of crystal orientation in one particle. Specifically, metal particle A has regions (A1 to A5) those are colored in two or more different colors, in one particle, in EBSD measurement. Next, the all solid state battery is initially charged (initial charging step). Upon charge, the all solid state battery is charged so that the battery voltage is in an appropriately high range. Thereby, an all solid state battery after the initial charge is obtained.

According to the present disclosure, by using a predetermined metal particle as the anode active material, and by charging the all solid state battery so that the battery voltage is in an appropriately high range, the all solid state battery capable of satisfying both of improving capacity durability and suppressing the increase of an initial resistance, may be obtained.

Although the metal particle such as Si here is a material whose energy may be made higher, it is difficult to produce an all solid state battery with high capacity durability, because of the large volume variation upon charge/discharge. In Patent Literature 1, upon the initial charge of an all solid state battery using an alloy based anode active material, the battery is charged to higher voltage than the voltage in normal use so that the amorphization of the alloy based anode active material is proceeded. Thus, the capacity durability is improved. More specifically, since the amorphized part reacts with Li preferentially, by increasing the proportion of the amorphized part so as to reduce local stress concentration, the capacity durability is improved.

However, when the battery voltage upon charge is high, the potential of the cathode active material becomes too high so that the cathode active material is easily deteriorated; as the result, this situation causes a new problem that the initial resistance of the all solid state battery is increased. Meanwhile, when the charging voltage is low, it is difficult to improve the capacity durability, although the increase of the initial resistance of the all solid state battery may be suppressed. As mentioned above, it is difficult to satisfy both of improving capacity durability and suppressing the increase of an initial resistance.

In relation to this, the inventors of the present disclosure has focused on the relationship of the crystallinity of a metal particle, a charging voltage and an amorphization rate, researched therefor, and found out that, compared to a case where a metal particle having single crystal orientation (hereinafter, may be referred to as single crystal particle) is used, the amorphization is proceeded even if the charging voltage is not so high as in conventional cases, if a metal particle having two kinds or more of crystal orientation in one particle (hereinafter, may be referred to as twin crystal particle) is used. By proceeding the amorphization, the capacity durability is improved. Further, since the charging voltage is not so high as in the conventional cases, the increase of the initial resistance may be suppressed. That is, by using the twin crystal particle and charging the battery so that the battery voltage is in an appropriately high range, effects such that both of improving capacity durability and suppressing the increase of an initial resistance may be satisfied, may be obtained.

The reason for the amorphization of the twin crystal particle being proceeded even at lower charging voltage than in the conventional cases is presumed as follows. The twin crystal particle has two kinds or more of crystal orientation in one particle, and the reactivity of the interface of the crystal orientation thereof is presumed to be high. The amorphization reaction here takes place locally in a part where the reactivity of the metal particle is high, but not in the metal particle as a whole. It is presumed that, compared to the single crystal particle, the proportion of the part with high reactivity is high in the twin crystal particle so that the amorphization is proceeded even at lower charging voltage than in the conventional cases. This effect is an effect peculiar to the twin crystal particle.

1. Preparing Step

The preparing step in the present disclosure is a step of preparing an all solid state battery including a cathode layer, a solid electrolyte layer, and an anode layer, in this order. The all solid state battery in the preparing step is a battery before the initial charging step. Also, in the preparing step, the all solid state battery may be prepared by manufacturing the all solid state battery by oneself, or the all solid state battery may be prepared by purchasing the all solid state battery from others.

The all solid state battery includes a cathode layer, a solid electrolyte layer, and an anode layer, in this order. Further, the anode layer includes a metal particle capable of being alloyed with Li, and having two kinds or more of crystal orientation in one particle, as an anode active material. The metal particle that is distinguishing in the present disclosure will be described here, and other components will be described in "B. All solid state battery" later.

The metal particle in the present disclosure has two kinds or more of crystal orientation in one particle. "The metal particle has two kinds or more of crystal orientation in one particle" means that the mapping image to be obtained by Electron Backscatter Diffraction Pattern (EBSD) measurement may be colored by two or more colors. EBSD measurement is one kind of crystal analysis by SEM (Scanning Electron Microscope). The specific method for the measurement is as follows.

First, a metal particle is embedded in resin, and the metal particle with the resin is cut to expose the cross section. EBSD measurement is conducted for the obtained cross section at the magnification that allows approximately 5 metal particles to be included, for example. The obtained diffraction pattern is analyzed to obtain the mapping image by IPF (Inverse Pole Figure) mapping. The conditions for the measurement are as follows:

Cross Section Production
    Apparatus: SM-09010 Cross Section Polisher™ from JEOL Ltd.; Ion source: Argon; Acceleration voltage: 5.5 kV
SEM
    Apparatus: JSM-7000F Field Emission Scanning Electron Microscope from JEOL Ltd.; Acceleration voltage: 7.5 kV
EBSD
    Apparatus: OIM™ Crystal Orientation Analysis Device from TSL Solutions Co., Ltd.; Acceleration voltage: 15 kV.

Incidentally, in the cross section production, for example, Apparatus: IM-4000 from Hitachi High-Technologies Corporation; Ion source: Ar; Acceleration voltage: 5.0 kV, are the conditions that may be used instead of the above described conditions.

The metal particle in the present disclosure has two kinds or more of crystal orientation in one particle. The number of crystal orientation that the metal particle has is two kinds or more; for example, it may be three kinds or more, and may be four kinds or more. Also, the number of the crystal orientation is, for example, ten kinds or less, may be nine kinds or less, and may be seven kinds or less. The number of the crystal orientation may be measured from, in the map image obtained from EBSD measurement, the number of regions separated by color and the difference of the colors. For example, as shown in FIG. 2, the number of crystal orientation is five kinds when the regions separated by color in metal particle A (one particle) is five, that are A1 to A5.

In the cross-section of the metal particle, among the two kinds or more of the crystal orientation included in one particle, when the area of the crystal orientation with the smallest area is regarded as $S_{Min}$ and the whole area of one particle is regarded as $S_{tot}$, the rate of $S_{Min}/S_{tot}$ is, for example, 1% or more, preferably 3% or more, and preferably 10% or more. Incidentally, the single crystal and the twin crystal are the series greatly differ from each other in reality; thus, even if the rate of $S_{Min}/S_{tot}$ is small, the judgement is presumably possible.

Examples of the metal particle may include a simple substance or an alloy including at least one kind of metal elements of a Si element, a Sn element, an In element, and an Al element. Above all, the metal particle is preferably a simple substance of Si or a Si alloy, and more preferably a simple substance of Si. If the metal particle is a Si alloy, the Si alloy preferably includes Si elements as a main component. The proportion of Si elements in the Si alloy may be, for example, 50 mol % or more, may be 70 mol % or more, and may be 90 mol % or more. Also, the proportion of Si elements in a simple substance of Si is usually 100 mol %.

The average particle size ($D_{50}$) of the metal particle is, for example, 10 nm or more, and may be 100 nm or more. Meanwhile, the average particle size ($D_{50}$) of the metal particle is, for example, 50 μm or less, and may be 20 μm or less.

Examples of the method for preparing the metal particle may include a method in which a metal particle with single crystal is mechanically crushed so as to obtain a twin crystal particle. For example, a shearing force is applied to the metal particle with a single crystal so as to mechanically crush the metal particle, and as the result, the crystallinity is presumably decreased and thus a twin crystal particle may be obtained. Also, examples of the method for preparing the metal particle may include a method in which the speed of the crystal growth is changed in the middle to obtain a twin crystal particle.

2. Initial Charging Step

The initial charging step in the present disclosure is a step of initially charging the all solid state battery. Also, in the initial charging step, the all solid state battery is charged so that the battery voltage is in an appropriately high range. In the present disclosure, "initial" is clearly distinguished from "first time". "Initial" is a broad concept that includes "first time". For example, the first time charge means the charging for the first time, literally; the initial charge is not necessarily the charging for the first time. For example, although an all solid state battery is charged and discharged for several times without reaching high enough voltage in order to avoid rights infringement, the step corresponds to the initial charging step in the present disclosure, if the all solid state battery is thereafter charged so that the battery voltage is in an appropriately high range. The initial charge is preferably, for example, the charging for the first time or more, and for the tenth time or less.

In the initial charging step, the battery is usually charged to the voltage of 4.35 V or more. In the present disclosure, the battery may be charged to the voltage of 4.40 V or more. The capacity durability may be improved by making the lower limit of the battery voltage upon the charge higher. Meanwhile, in the initial charging step, the battery is usually charged to the voltage of 4.55 V or less. In other words, the charging is stopped before the battery voltage exceeds 4.55 V. In the present disclosure, the battery may be charged to the voltage of 4.50 V or less. When the upper limit of the battery voltage upon the charge is too high, it becomes difficult to suppress the increase of the initial resistance. The method for charging is not limited, and a method using a common charging/discharging apparatus may be employed.

3. All Solid State Battery

The all solid state battery obtained by each above described step will be described in "B. All solid state battery" later.

B. All Solid State Battery

Figure 3:
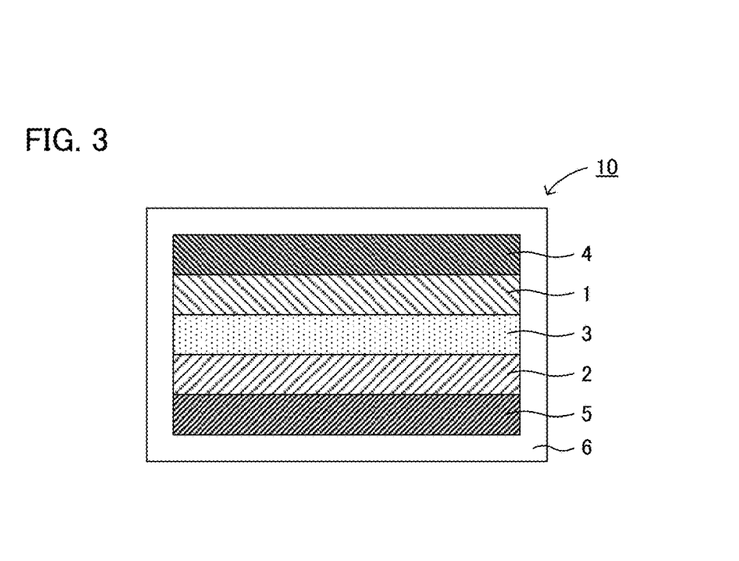
FIG. 3 is a schematic cross-sectional view illustrating an example of the all solid state battery of the present disclosure.

FIG. 3 is a schematic cross-sectional view illustrating an example of the all solid state battery of the present disclosure. All solid state battery 10 shown in FIG. 3 is a battery including cathode layer 1, solid electrolyte layer 3 and anode layer 2, in this order. Further, all solid state battery 10 includes cathode current collector 4 for collecting currents of cathode layer 1, anode current collector 5 for collecting currents of anode layer 2, and battery case 6. As shown in FIG. 2, for example, anode layer 2 includes metal particle A capable of being alloyed with Li, and having two kinds or more of crystal orientation in one particle, as an anode active material. Further, one feature is that the amorphization rate of metal particle A is in a predetermined range.

According to the present disclosure, a predetermined metal particle is used as the anode active material so that the amorphization rate thereof is in a predetermined range. Therefore, the all solid state battery is capable of satisfying both of improving capacity durability and suppressing the increase of an initial resistance.

1. Anode Layer

The anode layer in the present disclosure includes a metal particle capable of being alloyed with Li, and having two kinds or more of crystal orientation in one particle, as an anode active material. The metal particle may be in the same contents as those described in "A. Method for producing all solid state battery" above; thus, the description herein is omitted.

The amorphization rate of the metal particle is usually 40.2% or more, and may be 42% or more. The capacity durability is easily improved as the amorphization rate of the metal particle is higher. Meanwhile, the amorphization rate of the metal particle is usually 49.6% or less, and may be 48% or less. If the amorphization rate of the metal particle is too high, it becomes difficult to suppress the increase of the initial resistance. Incidentally, as described in Examples later, in a battery whose upper limit of the battery voltage in normal use is controlled to be lower than the battery voltage in the initial charge, it is thought that the amorphization would not be further proceeded while charging/discharging in normal use.

The amorphization rate of the metal particle may be determined by the method disclosed in Patent Literature 1 (JP-A No. 2017-059534). As described in Patent Literature 1, the amorphization rate may be determined by observing with a transmission electron microscope (TEM), and the amorphization rate may be determined from the correlative relationship based on a plurality of observations.

The anode layer may, as an anode active material, comprise only the metal particle, and may further comprise additional active material. In the latter case, the anode layer preferably comprises the metal particle as a main anode active material. The proportion of the metal particle with respect to all the anode active material is, for example, 50% by weight or more, may be 70% by weight or more, and may be 90% by weight or more. Also, when the anode layer comprises a single crystal particle as the anode active material, the proportion of the single crystal particle with respect to all the active material particle is, for example, 10% or less, may be 5% or less, and may be 2% or less.

The proportion of the anode active material in the anode layer is, for example, 30% by weight or more, and preferably 50% by weight or more. Also, the proportion of the anode active material is, for example, 99% by weight or less, may be 85% by weight or less, and may be 80% by weight or less.

The anode layer may further contain at least one of a solid electrolyte, a conductive additive, and a binder as required.

Examples of the solid electrolyte may include an inorganic solid electrolyte such as a sulfide solid electrolyte and oxide solid electrolyte. Examples of the sulfide solid electrolyte may include $Li_2S$—$P_2S_5$, $Li_2S$—$P_2S_5$—$Li_3PO_4$, $LiI$—$P_2S_5$—$Li_3PO_4$, $Li_2S$—$P_2S_5$—$GeS_2$, $Li_2S$—$P_2S_5$—$LiI$, $Li_2S$—$P_2S_5$—$LiI$—$LiBr$, $Li_2S$—$P_2S_5$—$Li_2O$, $Li_2S$—$P_2O_5$, $Li_2S$—$SiS_2$, $Li_2S$—$SiS_2$—$LiI$, $Li_2S$—$SiS_2$—$LiI$—$LiBr$, $Li_2S$—$SiS_2$—$LiBr$, $Li_2S$—$SiS_2$—$LiCl$, $Li_2S$—$SiS_2$—$P_2S_5$—$LiI$, $Li_2S$—$B_2S_3$, $Li_2S$—$P_2S_5$—$Z_mS_n$ (provided that m and n are positive numbers; Z is one of Ge, Zn, and Ga), $Li_2S$—$GeS_2$, $Li_2S$—$SiS_2$—$Li_3PO_4$, and $Li_2S$—$SiS_2$—$Li_xMO_y$ (provided that x and y are positive numbers; M is one of P, Si, Ge, B, Al, Ga, and In). Incidentally, the description "$Li_2S$—$P_2S_5$" refers to a sulfide solid electrolyte comprising a raw material composition that contains $Li_2S$ and $P_2S_5$, and the same applies for the others.

In particular, a sulfide solid electrolyte preferably comprises an ion conductor that contains Li, A (A is at least one kind of P, Si, Ge, Al, and B), and S. Further, the ion conductor preferably has an anion structure of an ortho composition ($PS_4^{3-}$ structure, $SiS_4^{4-}$ structure, $GeS_4^{4-}$ structure, $AlS_3^{3-}$ structure, and $BS_3^{3-}$ structure) as the main component of the anion. The reason therefor is to allow a sulfide solid electrolyte to have high chemical stability. The proportion of the anion structure of an ortho composition with respect to all the anion structures in the ion conductor is, preferably 70 mol % or more, and more preferably 90 mol % or more. The proportion of the anion structure of an ortho composition may be determined by methods such as a Raman spectroscopy, NMR, and XPS.

The sulfide solid electrolyte may contain lithium halide (LiX) in addition to the ion conductor. Examples of the lithium halide may include LiF, LiCl, LiBr, and LiI; among them, LiCl, LiBr, and LiI are preferable. The proportion of LiX in the sulfide solid electrolyte is, for example, in a range of 5 mol % or more and 30 mol % or less, and may be in a range of 15 mol % or more and 25 mol % or less.

The sulfide solid electrolyte may be a crystalline material, and may be an amorphous material. Also, the sulfide solid electrolyte may be glass, and may be crystallized glass (glass ceramics). Examples of the shape of the sulfide solid electrolyte may include a granular shape.

Meanwhile, examples of the conductive additive may include carbon materials such as acetylene black (AB), Ketjen black (KB), carbon fiber, carbon nanotube (CNT), and carbon nanofiber (CNF). Also, examples of the binder may include rubber-based binders such as butylene rubber (BR) and styrene butadiene rubber (SBR), and fluorine-based binders such as polyvinylidene fluoride (PVDF). Also, the thickness of the anode layer is, for example, 1 µm or more, and may be 3 µm or more. Meanwhile, the thickness of the anode layer is, for example, 300 µm or less, and may be 100 µm or less.

2. Cathode Layer

The cathode layer in the present disclosure is a layer that contains at least a cathode active material. Also, the cathode layer may further contain at least one of a solid electrolyte, a conductive additive and a binder as required.

Examples of the cathode active material may include an oxide active material. Examples of the oxide active material may include rock salt bed type active materials such as $LiCoO_2$, $LiMnO_2$, $LiNiO_2$, $LiVO_2$, and $LiNi_{1/3}Co_{1/3}Mn_{1/3}O_2$, spinel type active materials such as $LiMn_2O_4$, $Li_4Ti_5O_{12}$, and $Li(Ni_{0.5}Mn_{1.5})O_4$, and olivine type active materials such as $LiFePO_4$, $LiMnPO_4$, $LiNiPO_4$, and $LiCoPO_4$. Also, as the oxide active material, materials such as a LiMn-spinel active material represented by $Li_{1+x}Mn_{2-x-y}M_yO_4$ (M is at least one kind of Al, Mg, Co, Fe, Ni, and Zn; 0<x+y<2), and lithium titanate may be used.

A coating layer including a Li ion conductive oxide is preferably formed on the surface of the cathode active material. The reason therefor is to inhibit the side reaction of the cathode active material with the solid electrolyte. Examples of the Li ion conductive oxide may include $LiNbO_3$, $Li_4Ti_5O_{12}$, and $Li_3PO_4$. The thickness of the coating layer is, for example, 0.1 nm or more, and may be 1 nm or more. Meanwhile, the thickness of the coating layer is, for example, 100 nm or less, and may be 20 nm or less. Also, the coverage of the coating layer on the surface of the cathode active material is, for example, 50% or more, and preferably 80% or more.

The solid electrolyte material, the conductive additive and the binder to be used for the cathode layer are the same as in the case for the above described anode layer. The thickness of the cathode layer is, for example, 1 µm or more, and may be 3 µm or more. Meanwhile the thickness of the cathode layer is, for example, 300 µm or less, and may be 100 µm or less.

3. Solid Electrolyte Layer

The solid electrolyte layer in the present disclosure is a layer formed between the cathode layer and the anode layer. Also, the solid electrolyte layer contains at least a solid electrolyte, and may further contain a binder as required.

The solid electrolyte and the binder to be used for the solid electrolyte layer are the same as in the case for the above described anode layer. Also, the content of the solid electrolyte in the solid electrolyte layer is, for example, 10% by weight or more, and may be 50% by weight or more. Meanwhile, the content of the solid electrolyte in the solid electrolyte layer may be 100% by weight, and may be less than 100% by weight. The thickness of the solid electrolyte layer is, for example, 0.1 µm or more, and may be 1 µm or more. The thickness of the solid electrolyte layer is, for example, 300 µm or less, and may be 100 µm or less.

4. Other Constitution

The all solid state battery of the present disclosure usually comprises a cathode current collector for collecting currents of the cathode layer and an anode current collector for collecting currents of the anode layer. Examples of the materials for the cathode current collector may include SUS, aluminum, nickel, iron, titanium, and carbon. Meanwhile, examples of the materials for the anode current collector may include SUS, copper, nickel, and carbon. Incidentally, the thickness and the shape of the cathode current collector and the anode current collector are preferably appropriately selected according to the use of the battery. Also, as a battery case to be used in the present disclosure, a battery case of a general battery may be used, and an example may be a battery case made of SUS.

Also, the all solid state battery of the present disclosure may include a confining jig that applies a confining pressure in the thickness direction, to at least the cathode layer, the solid electrolyte layer and the anode layer. The confining pressure is, for example, 3 MPa or more, and may be 5 MPa or more. Meanwhile, the confining pressure is, for example, 100 MPa or less, may be 50 MPa or less, and may be 20 MPa or less.

5. All Solid State Battery

The all solid state battery of the present disclosure may be a primary battery and may be a secondary battery, and the latter is preferable so as to be repeatedly charged and discharged, and be useful as a car-mounted battery, for example. Incidentally, the secondary battery includes the use of a secondary battery as a primary battery (use for the purpose of discharge just once after charge). Examples of the shape of the all solid state battery may include a coin shape, a laminate shape, a cylindrical shape, and a square shape.

The all solid state battery may comprise only one power generation element of a cathode layer, a solid electrolyte layer and an anode layer, and may comprise two or more thereof. In the latter case, a plurality of the power generation elements may be connected in parallel, and may be connected in series.

C. All Solid State Battery System

Figure 4:
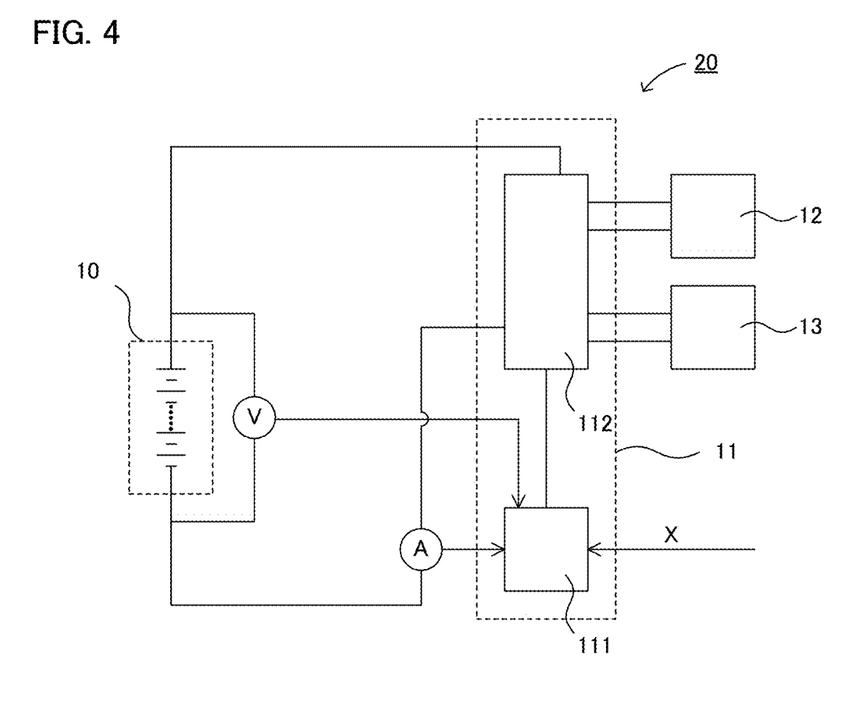
FIG. 4 is a schematic cross-sectional view illustrating an example of the all solid state battery system of the present disclosure.

FIG. 4 is a schematic view illustrating an example of the all solid state battery system of the present disclosure. All solid state battery system 20 shown in FIG. 4 includes at least all solid state battery 10 and controlling apparatus 11 controlling charge and discharge of all solid state battery 10. Controlling apparatus 11 includes, for example, ECU (Electronic Control Unit) 111 and PCU (Power Control Unit) 112. ECU (Electronic Control Unit) 111 instructs PCU 112 to charge/discharge (for example, an instruction to start or an instruction to stop) based on command X from outside (for example, charging command or discharging command) and voltage V and current A of all solid state battery 10. During discharge, PCU 112 supplies power to load 12, and during charge, it receives power from power source 13. Controlling apparatus 11 is an apparatus that controls the upper limit of the battery voltage.

According to the present disclosure, by using the above described all solid state battery and by controlling the upper limit of the battery voltage thereof, the all solid state battery system is capable of satisfying both of improving capacity durability and suppressing the increase of an initial resistance, and further, suppressing the increase of a resistance over time.

1. All Solid State Battery

The all solid state battery in the present disclosure may be in the same contents as those described in "B. All solid state battery" above; thus, the description herein is omitted.

2. Controlling Apparatus

The controlling apparatus in the present disclosure is an apparatus that controls the charge/discharge of the all solid state battery. The battery voltage in normal use is controlled by the controlling apparatus. As shown in FIG. 4 for example, examples of the controlling apparatus may include controlling apparatus 11 including ECU (Electronic Control Unit) 111 and PCU (Power Control Unit) 112. ECU preferably includes a microcontroller (MCU). Also, PCU preferably includes a converter and an inverter, and may further include a cooling mechanism.

The controlling apparatus has at least a function to control the upper limit of the battery voltage. That is, when the battery voltage increases by being charged in normal use, it stops the charging at a stage of predetermined value. The upper limit of the battery voltage is usually 4.35 V or less, may be 4.30 V or less, and may be 4.25 V or less.

The controlling apparatus preferably has a function to control the lower limit of the battery voltage. That is, when the battery voltage decreases by being discharged in normal use, it stops the discharging at a stage of predetermined value. The lower limit of the battery voltage is not particularly limited, and is appropriately set according to the use application of the all solid state battery system. The lower limit is, for example, 2 V or more, may be 2.5 V or more, and may be 3.0 V or more.

Incidentally, the present disclosure is not limited to the embodiments. The embodiments are exemplification, and any other variations are intended to be included in the present disclosure if they have substantially the same constitution as the technical idea described in the claim of the present disclosure and offer similar operation and effect thereto.

EXAMPLES

Producing Example 1

Preparation of Metal Particle

Si particles (Supreme microncut Supreme20) of which average particle size was intended to be 20 μm was ordered to Elkem.

Figure 5A:
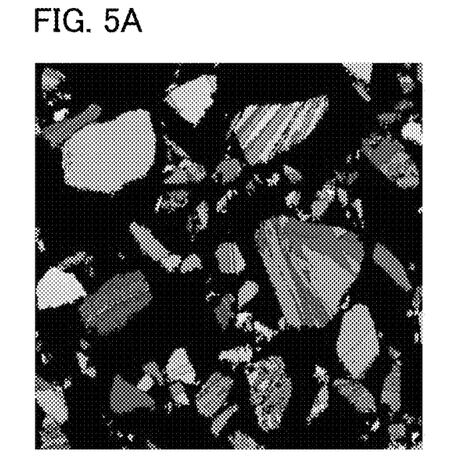
FIGS. 5A and 5B are the results of an EBSD measurement for the Si particles (anode active materials) in Producing Examples 1 and 2.

The Si particle produced was checked by the EBSD measurement; as the result, as shown in FIG. 5A, it was confirmed that the Si particles (metal particles) had two kinds to seven kinds of crystal orientations in one particle. Also, the proportion of the single crystal particle in the entire Si particles used in Producing Example 1 was 2% or less; for example, in the EBSD measurement, one single crystal particle may be observed out of 50 Si particles in some cases.

Production of Anode Layer

Butyl butyrate, a butyl butyrate solution containing a PVDF-based binder of 5% by weight, an anode active material (metal particle), a sulfide solid electrolyte ($Li_2S$—$P_2S_5$-based glass ceramics), and a conductive additive (VGCF) were added to a container made of polypropylene (PP) and stirred by an ultrasonic dispersion apparatus (UH-50 from SMT Corporation) for 30 seconds. After that, the stirred material was shaken by a shaker (TTM-1 from SIBATA SCIENTIFIC TECHNOLOGY LTD.) for 3 minutes. Thereby, anode slurry was obtained. The obtained anode slurry was pasted on an anode current collector (a Cu foil, manufactured by UACJ Corporation) by a blade method using an applicator, and then dried on a hot plate at 100° C. for 30 minutes. An anode layer and an anode current collector were obtained in the above manner.

Production of Cathode Layer

Butyl butyrate, a butyl butyrate solution containing a PVDF-based binder of 5% by weight, a cathode active material ($LiNi_{1/3}Co_{1/3}Mn_{1/3}O_2$; average particle size $D_{50}$=6 μm), a sulfide solid electrolyte ($Li_2S$-$P_2S_5$-based glass ceramics), and a conductive additive (VGCF) were added to a container made of polypropylene (PP) and stirred by an ultrasonic dispersion apparatus (UH-50 from SMT Corporation) for 30 seconds. After that, the stirred material was shaken by a shaker (TTM-1 from SIBATA SCIENTIFIC TECHNOLOGY LTD.) for 3 minutes, further, stirred by an ultrasonic dispersion apparatus for 30 seconds, and then, shaken by a shaker for 3 minutes. Thereby, cathode slurry was obtained. The obtained cathode slurry was pasted on a cathode current collector (an Al foil from SHOWA DENKO K.K) by a blade method using an applicator, and then dried on a hot plate at 100° C. for 30 minutes. A cathode layer and a cathode current collector were obtained in the above manner.

Production of Solid Electrolyte Layer

Heptane, a heptane solution containing a butylene rubber (BR)-based binder of 5% by weight, and a sulfide solid electrolyte ($Li_2S$-$P_2S_5$-based glass ceramics) were added to a container made of polypropylene (PP) and stirred by an ultrasonic dispersion apparatus (UH-50 from SMT Corporation) for 30 seconds. After that, the stirred material was shaken by a shaker (TTM-1 from SIBATA SCIENTIFIC TECHNOLOGY LTD.) for 30 minutes. Thereby, solid electrolyte slurry was obtained. The obtained slurry was pasted on a release sheet (an Al foil) by a blade method using an applicator, and then dried on a hot plate at 100° C. for 30 minutes. A transfer member having an intermediate solid electrolyte layer and a release sheet was obtained in the above manner. Also, the solid electrolyte slurry was pasted on the cathode layer, thereby, a cathode stack having a first solid electrolyte layer, a cathode layer and a cathode current collector was obtained. Similarly, the solid electrolyte slurry was pasted on the anode layer, thereby, an anode stack having a second solid electrolyte layer, an anode layer and an anode current collector was obtained.

Production of Evaluation Battery

The cathode stack was set in a roll pressing machine, pressed under 20 kN/cm (about 710 MPa) at 165° C., and a first stack was obtained. Next, the anode stack was set in a roll pressing machine, pressed under 20 kN/cm (about 710 MPa) at 25° C., and a second stack was obtained. Next, the transfer member and the anode stack were stacked so that the intermediate solid electrolyte layer contacted the second solid electrolyte layer. This stack was set in a uniaxial flat pressing machine, and was temporary pressed under 100 MPa, at 25° C. for 10 seconds. Then, the release sheet was peeled off from the intermediate solid electrolyte layer, and a third stack was obtained. Next, the first stack and the third stack were stacked so that the first solid electrolyte layer contacted the intermediate solid electrolyte layer. Incidentally, the area of the anode layer was made to be larger than the area of the cathode layer. This stack was set in a uniaxial flat pressing machine, and was pressed under 200 MPa, at 135° C. for 1 minute to obtain an evaluation battery. Also, a confining pressure was applied to the evaluation battery by a confining jig.

Producing Example 2

Figure 5B:
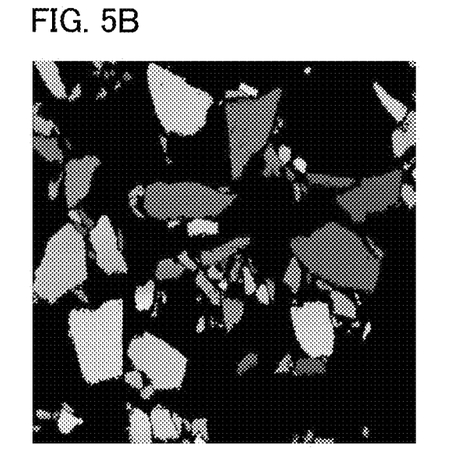

An evaluation battery was obtained in the same manner as in Producing Example 1, except that Si particles (SIE23PB from Kojundo Chemical Laboratory Co., Ltd.) were used as the anode active material. The Si particle used in Producing Example 2 was checked by the EBSD measurement, and as shown in FIG. 5B, it was confirmed that the Si particles had one kind of crystal orientation.

Example 1

An initial resistance and capacity durability were determined by charging and discharging the evaluation battery obtained in Producing Example 1 under the following conditions. First, for the first time charge, the battery was charged in constant current/constant voltage to 4.55 V (the final current: 1/100 C) at the hourly rate of 10 (1/10 C). Next, for the first time discharge, the battery was discharged in constant current/constant voltage to 2.5 V. Next, the initial discharge capacity (discharge capacity before the durability test) was determined by charging the battery in constant current/constant voltage to 4.35 V, and discharging the battery in constant current/constant voltage to 2.5 V. Next, for adjusting SOC (state of charge), the battery was charged in constant current/constant voltage to 3.9 V, and the battery was discharged in constant current/constant voltage to 3.7 V. Next, the initial resistance was determined by discharging the battery at current value of 17.15 $mA/cm^2$ for 5 seconds, and dividing the voltage variation $\Delta V$ before and after the discharge, by the current value. Next, a cycle of charging to 4.22 V at the hourly rate of 0.5 (2 C) followed by discharging to 3.14 V was repeated for 300 times. Next, the discharge capacity after the durability test was determined by charging the battery in constant current/constant voltage to 4.35 V, and discharging the battery in constant current/constant voltage to 2.5 V. The capacity durability was determined as the proportion of the discharge capacity after the durability test with respect to the discharge capacity before the durability test.

Example 2

The capacity durability and the initial resistance were determined in the same manner as in Example 1, except that the upper limit of the battery voltage in the first time charge was changed to 4.45 V.

Example 3

The capacity durability and the initial resistance were determined in the same manner as in Example 1, except that the upper limit of the battery voltage in the first time charge was changed to 4.35 V.

Reference Example 1

The capacity durability and the initial resistance were determined in the same manner as in Example 1, except that the upper limit of the battery voltage in the first time charge was changed to 4.25 V.

Comparative Examples 1 to 4

The capacity durability and the initial resistance were determined in the same manner as in Examples 1 to 3 and Reference Example 1 respectively, except that the evaluation battery obtained in Producing Example 2 was used. The results are shown in Table 1 below. Incidentally, the values of the capacity durability and the initial resistance shown in Table 1 are relative values when the capacity durability and the initial resistance in Comparative Example 1 are regarded as 100, respectively.

TABLE 1

|  | Number of crystal orientation in one particle | First time charging voltage [V] | Upper limit of charging voltage [V] | Capacity durability | Initial resistance |
|---|---|---|---|---|---|
| Example 1 | 2~7 | 4.55 | 4.35 | 102 | 97 |
| Example 2 | 2~7 | 4.45 |  | 101 | 91 |
| Example 3 | 2~7 | 4.35 |  | 100 | 94 |
| Reference Ex. 1 | 2~7 | 4.25 |  | 93 | 93 |
| Comp. Ex. 1 | 1 | 4.55 |  | 100 | 100 |
| Comp. Ex. 2 | 1 | 4.45 |  | 97 | 94 |
| Comp. Ex. 3 | 1 | 4.35 |  | 93 | 91 |
| Comp. Ex. 4 | 1 | 4.25 |  | 93 | 93 |

As shown in Table 1, compared to Comparative Example 1, the capacity durability was high and the initial resistance was low in Examples 1 to 3. That is, it was able to satisfy both of improving capacity durability and suppressing the increase of an initial resistance. Comparing Comparative Examples 1 to 3 here, regarding Comparative Example 1 which was the highest in the first time charging voltage, was the highest in the capacity durability. This suggests that the capacity durability improves by making the first time charging voltage higher. Meanwhile, regarding Comparative Example 1 which was the highest in the first time charging voltage, was also the highest in the initial resistance. This suggests that the initial resistance increases by making the first time charging voltage higher. That is, in Comparative Examples 1 to 3, although the capacity durability improves when the first time charging voltage is high, increase of the initial resistance was confirmed. Incidentally, the first time charging voltage (4.25 V) was lower than the upper limit voltage in subsequent charge/discharge (4.35 V) in Comparative Example 4; however, in this case, the capacity durability could not be improved.

Meanwhile, in Examples 1 to 3, the capacity durability was higher and the initial resistance was lower than Comparative Example 1. Particularly in Examples 2 and 3, although the first time charging voltage was lower than Example 1, the capacity durability was as good as, or better than Example 1. Further, since the first time charging voltage was low in Examples 2 and 3, the increase in the initial resistance could be sufficiently suppressed. That is, it was confirmed that, when metal particles having two kinds or more of crystal orientation in one particle, were used as the anode active material, the capacity durability was improved even though the first time charging voltage was relatively low. Further, it was confirmed that the increase of the initial resistance was sufficiently suppressed, since the first time charging voltage was relatively low.

Reference Examples 2-1 to 2-3

An amorphization rate measurement was conducted for the anode active material after the first time charge in Examples 1 and 3, respectively (Reference Example 2-1 and Reference Example 2-2). Also, an amorphization rate measurement was conducted similarly except that the upper limit of the battery voltage in the first time charge was changed to 3.75 V (Reference Example 2-3). The method for measuring the amorphization rate was similar to the method disclosed in Patent Literature 1 (JP-A No. 2017-059534). The results are shown in Table 2.

TABLE 2

|  | Number of crystal orientation in one particle | First time charging voltage [V] | Amorphization rate [%] |
|---|---|---|---|
| Reference Ex. 2-1 | 2~7 | 4.55 | 49.6 |
| Reference Ex. 2-2 | 2~7 | 4.35 | 40.2 |
| Reference Ex. 2-3 | 2~7 | 3.75 | 28.7 |

As shown in Table 2, it was confirmed that, when the first time charging voltage was higher, the amorphization rate of the anode active material was improved. Incidentally, the reaction potential that an anode active material is amorphized is usually sufficiently lower than the reaction potential of an anode active material and a Li ion. Therefore, in a battery whose upper limit of charging voltage (upper limit of battery voltage in normal use) is controlled to be lower than the first time charging voltage (battery voltage in the initial charge), for example, it is thought that the amorphization would not be further proceeded while charging/discharging in normal use. In other words, whether the initial charging step in the present disclosure was conducted or not may be determined by investigating the amorphization rate of the anode active material.

REFERENCE SIGNS LIST

1 . . . cathode layer
2 . . . anode layer
3 . . . solid electrolyte layer
4 . . . cathode current collector
5 . . . anode current collector
10 . . . all solid state battery
11 . . . controlling apparatus
20 . . . all solid state battery system

What is claimed is:

1. A method for producing an all solid state battery, the method comprising:
    a preparing step of preparing an all solid state battery including a cathode layer, a solid electrolyte layer, and an anode layer, in this order; and
    an initial charging step of initially charging the all solid state battery, wherein
    the anode layer includes a metal particle capable of being alloyed with Li, and the metal particle is a twin crystal particle having two kinds or more of crystal orientation in one particle, as an anode active material, and
    in the initial charging step, the all solid state battery is charged to a battery voltage of 4.35 V or more and 4.55 V or less.

2. The method for producing an all solid state battery according to claim 1, wherein the metal particle is a simple substance of Si or a Si alloy.

3. The method for producing an all solid state battery according to claim 1, wherein the anode layer includes a sulfide solid electrolyte.

4. An all solid state battery comprising a cathode layer, a solid electrolyte layer, and an anode layer, in this order, and
    the anode layer includes a metal particle capable of being alloyed with Li, and the metal particle is a twin crystal particle having two kinds or more of crystal orientation in one particle, as an anode active material, and
    an amorphization rate of the metal particle is 40.2% or more and 49.6% or less.

5. The all solid state battery according to claim 4, wherein the metal particle is a simple substance of Si or a Si alloy.

6. The all solid state battery according to claim 4, wherein the anode layer includes a sulfide solid electrolyte.

7. An all solid state battery system comprising the all solid state battery according to claim 4, and a controlling apparatus controlling charge and discharge of the all solid state battery, and
- the controlling apparatus is an apparatus that controls an upper limit of a battery voltage to 4.35 V or less.

* * * * *